US012694335B2

(12) United States Patent
Ulasen et al.

(10) Patent No.: US 12,694,335 B2
(45) Date of Patent: Jul. 28, 2026

(54) SYSTEMS AND METHODS FOR REPURPOSING A MACHINE LEARNING MODEL

(71) Applicant: Acronis International GmbH, Schaffhausen (CH)

(72) Inventors: Sergey Ulasen, Moscow (RU); Alexander Tormasov, Moscow (RU); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 822 days.

(21) Appl. No.: 18/152,820

(22) Filed: Jan. 11, 2023

(65) Prior Publication Data

US 2023/0325717 A1     Oct. 12, 2023

Related U.S. Application Data

(60) Provisional application No. 63/322,322, filed on Mar. 22, 2022.

(51) Int. Cl.
G06N 20/00 (2019.01)

(52) U.S. Cl.
CPC .................................... G06N 20/00 (2019.01)

(58) Field of Classification Search
CPC ...................................................... G06N 20/00
USPC .......................................................... 706/12
See application file for complete search history.

(56) References Cited

U.S. PATENT DOCUMENTS

| | | | | |
|---|---|---|---|---|
| 2019/0114390 A1* | 4/2019 | Donner | .................. | G16B 20/00 |
| 2019/0325299 A1* | 10/2019 | Oliveira Pinheiro | .... | G06N 3/08 |
| 2020/0005191 A1* | 1/2020 | Ganti | ..................... | G06N 20/00 |
| 2020/0104710 A1* | 4/2020 | Vasudevan | .............. | G06N 3/09 |
| 2020/0320379 A1* | 10/2020 | Watson | .................. | G06N 3/096 |
| 2020/0364551 A1* | 11/2020 | Dwivedi | .................. | G06N 3/08 |
| 2022/0027339 A1* | 1/2022 | Haim | .................. | G06F 16/2282 |

(Continued)

OTHER PUBLICATIONS

Thabtah et al., "A dynamic self-structuring neural network model to combat phishing", 2016 International Joint Conference on Neural Networks (IJCNN), Jul. 24-29, 2016, pp. 4221-4226. (Year: 2016).*

(Continued)

*Primary Examiner* — Hwei-Min Lu
(74) *Attorney, Agent, or Firm* — ArentFox Schiff LLP; Michael Fainberg

(57) ABSTRACT

Disclosed herein are systems and method for repurposing a machine learning model. An exemplary method includes: receiving a first training dataset; determining an input portion and an output portion in an entry of the first training dataset; comparing the first training dataset to a second training dataset used to train a machine learning model, wherein the comparing includes determining a similarity score between the input portion and the output portion of the first training dataset and an input portion and an output portion of the second training dataset; in response to determining that the similarity score is greater than a threshold similarity score, re-training the machine learning model using the first training dataset; and executing the re-trained machine learning model on an input value to generate an output value corresponding to the first training dataset.

19 Claims, 3 Drawing Sheets

100

(56) References Cited

U.S. PATENT DOCUMENTS

| | | | |
|---|---|---|---|
| 2022/0114473 A1* | 4/2022 | Awasthy | G06N 3/045 |
| 2023/0169389 A1* | 6/2023 | Zhou | G06N 3/096 |
| | | | 706/15 |

OTHER PUBLICATIONS

Afridi et al., "On automated source selection for transfer learning in convolutional neural networks", Pattern Recognition 73 (2018), Jul. 26, 2017, pp. 65-75. (Year: 2018).*

Desai et al., "neuralRank: Searching and ranking ANN-based model repositories", Arxiv ID: 1903.00711, Mar. 2, 2019. (Year: 2019).*

Sigl et al., "Don't Fear the Reaper: A Framework for Materializing and Reusing Deep-Learning Models", 2019 IEEE 35th International Conference on Data Engineering (ICDE), Apr. 8-11, 2019, pp. 2091-2095. (Year: 2019).*

Kalhor et al., "Ranking and Rejecting of Pre-Trained Deep Neural Networks in Transfer Learning based on Separation Index", Arxiv ID: 2012.13717, Dec. 26, 2020. (Year: 2020).*

Sadreddin et al., "Incremental Feature Learning Using Constructive Neural Networks", 2021 IEEE 33rd International Conference on Tools with Artificial Intelligence (ICTAI), Nov. 1-3, 2021, pp. 704-708. (Year: 2021).*

Zhao et al., "An Efficient Source Model Selection Framework in Model Databases", Arxiv ID: 2110.06532v3, Nov. 24, 2021. (Year: 2021).*

* cited by examiner

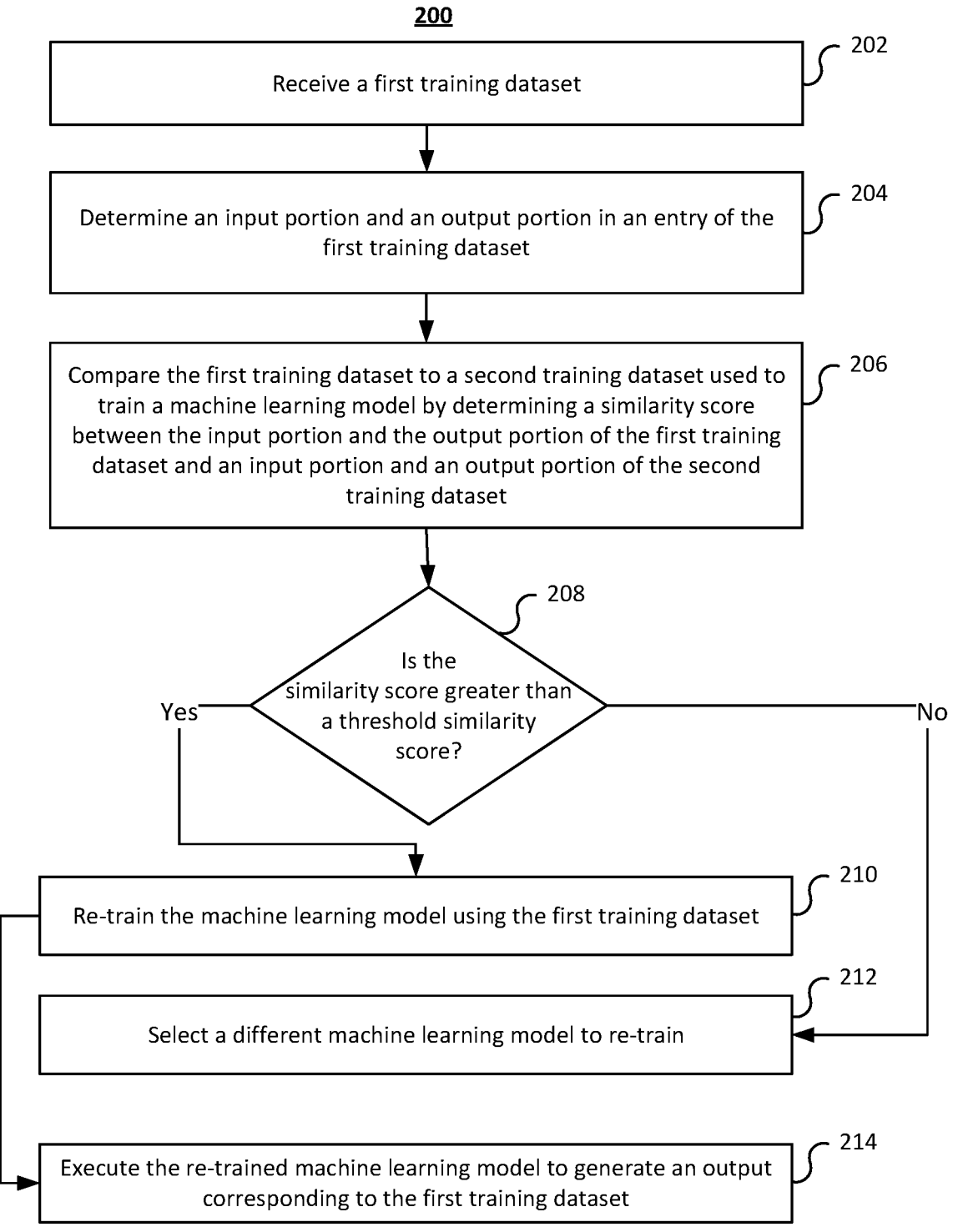

<u>200</u>

Receive a first training dataset ⟩ 202

Determine an input portion and an output portion in an entry of the first training dataset ⟩ 204

Compare the first training dataset to a second training dataset used to train a machine learning model by determining a similarity score between the input portion and the output portion of the first training dataset and an input portion and an output portion of the second training dataset ⟩ 206

Is the similarity score greater than a threshold similarity score? ⟩ 208

Yes          No

Re-train the machine learning model using the first training dataset ⟩ 210

Select a different machine learning model to re-train ⟩ 212

Execute the re-trained machine learning model to generate an output corresponding to the first training dataset ⟩ 214

FIG. 2

SYSTEMS AND METHODS FOR REPURPOSING A MACHINE LEARNING MODEL

CROSS-REFERENCE TO RELATED APPLICATIONS

This application claims the benefit of U.S. Provisional Application No. 63/322,322, filed Mar. 22, 2022, which is herein incorporated by reference.

FIELD OF TECHNOLOGY

The present disclosure relates to the field of artificial intelligence, and, more specifically, to systems and methods for repurposing a machine learning model.

BACKGROUND

Artificial intelligence algorithms usually have two types of users: a developer who creates new tools, and a client who uses those tools. In both cases, users may need a solution that allows them to quickly apply a solution used in one domain to another. For example, a developer may create a machine learning model for image classification of a particular object (e.g., a car). A user that is interested in classifying a different object (e.g., a table) may want to use the machine learning model for their own purposes. In its trained state, the machine learning model may be unable to classify the table because it is configured to classify an object as a car or as not a car. Accordingly, the machine learning model needs to be repurposed to meet the needs of the user.

However, simply retraining the machine learning model with table images may not be an effective approach. For example, the machine learning model may be very accurate in classifying a car, but may not be as effective in classifying a table even after re-training (e.g., due to training style, object feature distinctions, etc.). Furthermore, certain machine learning models require a training dataset to be of a certain size and the dataset of table images may be relatively small. Another point is that certain machine learning models have multiple inputs/outputs. For example, the user may want to classify multiple objects, but the machine learning model may only be structured to classify a single object.

Given the issues in compatibility and model accuracy, applying a machine learning model to any arbitrary training dataset is difficult. There thus exists a need to repurpose machine learning models to make them more efficient for an arbitrary dataset.

SUMMARY

In one exemplary aspect, the techniques described herein relate to a method for repurposing a machine learning model, the method including: receiving a first training dataset; determining an input portion and an output portion in an entry of the first training dataset; comparing the first training dataset to a second training dataset used to train a machine learning model, wherein the comparing includes determining a similarity score between the input portion and the output portion of the first training dataset and an input portion and an output portion of the second training dataset; in response to determining that the similarity score is greater than a threshold similarity score, re-training the machine learning model using the first training dataset; and executing the re-trained machine learning model on an input value to generate an output value corresponding to the first training dataset.

In some aspects, the techniques described herein relate to a method, wherein determining the similarity score between the input portion and the output portion of the first training dataset and the input portion and the output portion of the second training dataset includes: determining a first structure of the input portion and the output portion of the first training dataset, wherein structure indicates a type of value in a given portion and a size of the given portion; determining a second structure of the input portion and the output portion of the second training dataset; and determining a distance between the first structure with the second structure, wherein the similarity score is a function of the distance.

In some aspects, the techniques described herein relate to a method, wherein the machine learning model is an image classifier, and wherein determining the similarity score further includes: identifying an object that the machine learning model is configured to classify in accordance with the second training dataset; identifying another object associated with the first training dataset; and comparing the object and the another object based on pixel representation, wherein the similarity score is a function of the comparing of objects.

In some aspects, the techniques described herein relate to a method, wherein comparing the first training dataset to the second training dataset further includes comparing a size of the first training dataset and the second training dataset, wherein the similarity score is a function of a size difference.

In some aspects, the techniques described herein relate to a method, wherein comparing the first training dataset to the second training dataset further includes comparing a size of entries in the first training dataset and the second training dataset, wherein the similarity score is a function of a size difference of the entries.

In some aspects, the techniques described herein relate to a method, wherein the machine learning model is one of a plurality of machine learning models each with a corresponding training dataset, further including: determining a plurality of similarity scores by comparing the first training dataset to each corresponding training dataset; ranking the plurality of similarity scores; and selecting the machine learning model to re-train in response to determining that the similarity score between the first training dataset and the second training dataset is highest in the ranking.

In some aspects, the techniques described herein relate to a method, further including: in response to determining that the similarity score is not the highest in the ranking, selecting a different machine learning model that is the highest in the ranking; re-training the different machine learning model using the first training dataset; and executing the re-trained different machine learning model to generate the output corresponding to the first training dataset.

In some aspects, the techniques described herein relate to a method, further including: amending code associated with the machine learning model to accommodate structure differences between the first training dataset and the second training dataset.

It should be noted that the methods described above may be implemented in a system comprising a hardware processor. Alternatively, the methods may be implemented using computer executable instructions of a non-transitory computer readable medium.

In some aspects, the techniques described herein relate to a system for repurposing a machine learning model, the system including: a memory; and a hardware processor communicatively coupled with the memory and configured to: receive a first training dataset; determine an input portion and an output portion in an entry of the first training dataset; compare the first training dataset to a second training dataset used to train a machine learning model, wherein the comparing includes determining a similarity score between the input portion and the output portion of the first training dataset and an input portion and an output portion of the second training dataset; in response to determining that the similarity score is greater than a threshold similarity score, re-train the machine learning model using the first training dataset; and execute the re-trained machine learning model on an input value to generate an output value corresponding to the first training dataset.

In some aspects, the techniques described herein relate to a non-transitory computer readable medium storing thereon computer executable instructions for repurposing a machine learning model, including instructions for: receiving a first training dataset; determining an input portion and an output portion in an entry of the first training dataset; comparing the first training dataset to a second training dataset used to train a machine learning model, wherein the comparing includes determining a similarity score between the input portion and the output portion of the first training dataset and an input portion and an output portion of the second training dataset; in response to determining that the similarity score is greater than a threshold similarity score, re-training the machine learning model using the first training dataset; and executing the re-trained machine learning model on an input value to generate an output value corresponding to the first training dataset.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 2 illustrates a flow diagram of a method for repurposing a machine learning model.

DETAILED DESCRIPTION

Exemplary aspects are described herein in the context of a system, method, and computer program product for repurposing a machine learning model. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
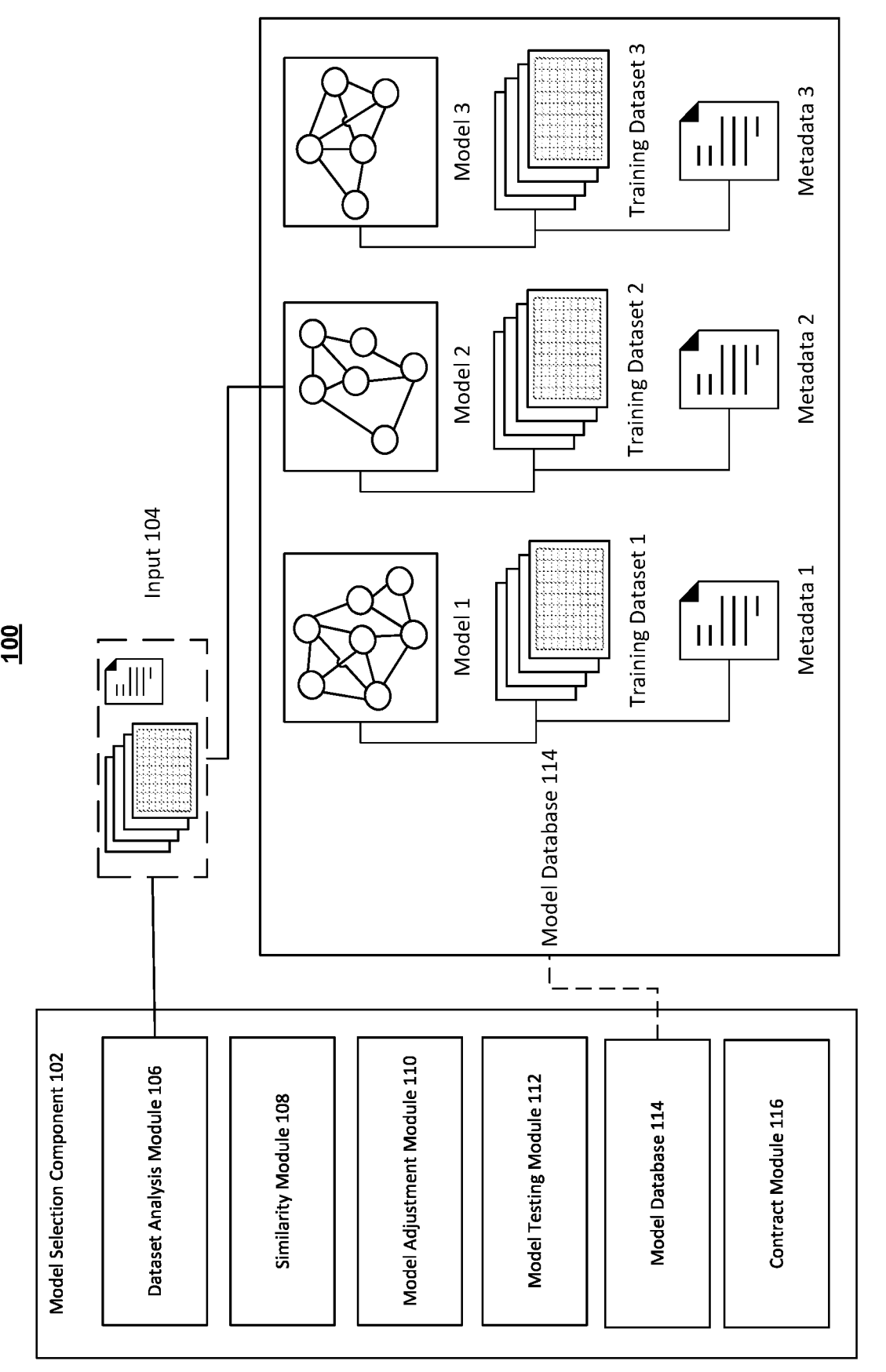
FIG. 1 is a block diagram illustrating a system for repurposing a machine learning model.

FIG. 1 is a block diagram illustrating system 100 for repurposing a machine learning model. System 100 includes model selection component 102, which may be a software installed on a computer system (e.g., computer system 20 of FIG. 3). A hardware processor may execute model selection component 102.

Model selection component 102 may include a plurality of modules, namely: dataset analysis module 106, similarity module 108, model adjustment module 110, model testing module 112, model database 114, and contract module 116. In some aspects, model selection component 102 may be split as a thick and thin client application. The thin client application may run on a computing device such as a smartphone or laptop and the thick client application may run on a different computing device such as a server. The thin client application may be configured to receive input 104 via a graphical user interface and transmit the contents of input 104 to the thick client application. The thick client application may execute the plurality of modules and provide a trained machine learning model to the thin client application, which may execute the trained model to produce outputs.

Input 104 represents a training dataset and its corresponding metadata that a user would like to repurpose a machine learning model around. In FIG. 1, there are three example machine learning models in database 114. One skilled in the art will appreciate that only three examples are given for simplicity, but any number of models may be stored in database 114. In some aspects, the machine learning models are stored as executable files. In other aspects, the machine learning models are stored as a collection of files including code, text files including learned weights to apply on feature vectors, and any libraries needed to execute the code. In other aspects, the machine learning models are stored as containers with all the necessary files needed to run the trained models. Each model is accompanied by a training dataset that was originally used to train the machine learning model. A respective training dataset may be one that was used to generate the learned weights of a given machine learning model. Each model is further accompanied by metadata, which may include information about the model type (e.g., classification, regression, decision tree, etc.), input vector dimensions (e.g., 300×300), output vector dimensions (e.g., 1×2), size of training dataset (e.g., 10,000 images), training functions utilized (e.g., Adaboost, gradient descent, etc.), name of creator, etc. In some aspects, the model may be a neural network and the metadata may further specify the number of layers/neurons, and the functions used in each layer (e.g., max pooling, sigmoid, convolution, etc.).

FIG. 2 illustrates a flow diagram of method 200 for repurposing a machine learning model. At 202, model selection component 102 receives a first training dataset (e.g., in input 104). Suppose that the first training dataset includes images depicting cars and other objects. At 204, dataset analysis module 106 determines an input portion and an output portion in an entry of the first training dataset. For example, an entry (also referred to as an input vector) may be divided into the input portion and the output portion. The input portion may be a numerical representation of an image (e.g., pixel values) and the output portion may be a binary classification (e.g., "1" for car and "0" for no car).

At 206, similarity module 108 compares the first training dataset to a second training dataset used to train a machine learning model by determining a similarity score between the input portion and the output portion of the first training dataset and an input portion and an output portion of the second training dataset. For example, similarity module 108 may compare the training dataset of input 104 to training dataset 1 in database 114.

In some aspects, similarity module 108 may select a training dataset from database 114 based on the metadata in input 104. For example, the metadata may indicate a purpose associated with the first training dataset. In this case, the purpose may be to classify images (e.g., of cars). Accordingly, similarity module 108 may search for models in database 114 that have metadata indicative of image classification. If the purpose in input 104 indicates predicting numerical values, similarity module 108 may search for models in database 114 that have metadata indicative of regression. These searched models are candidates for repurposing.

Suppose that machine learning model 1 is an image classifier. In some aspects, similarity module 108 may determine the similarity score by identifying an object (e.g., planes) that machine learning model 1 is configured to classify in accordance with the second training dataset (e.g., training dataset 1). Similarity module 108 may identify another object (e.g., cars) associated with the first training dataset (e.g., of input 104), and may compare the object and the another object based on pixel representation. For example, similarity module 108 may use a computer vision technique (e.g., keypoint matching, mean squared error, etc.) to determine the commonality between the two objects. Here, the similarity score is a function of the comparing of objects by the computer vision technique. For example, using one of the computer vision techniques, similarity module 108 may determine that there is an average difference of 50% in pixels across all of the images in both training datasets. The similarity score may be a weighted inverse of this average difference. For example, the similarity score may be calculated as 2*1/50, which is 0.04. As the difference lessens, the similarity score increases.

In general, the closer in appearance the original object in the original training dataset is to the new object in the input training dataset, the closer the accuracy of the machine learning model will be once re-trained. For example, a machine learning model originally trained to classify horses, but now re-trained to classify dogs, will perform comparably because the features between dogs and horses are not significantly different (e.g., four legs, nose, ears, etc.). On the other hand, if the machine learning model is re-trained to classify balloons, the accuracy may not be comparable. In fact, because the objects are so different, the re-trained model may have a degraded accuracy as the original machine learning model may be specifically optimized for the original training dataset.

In some aspects, comparing the first training dataset to the second training dataset further comprises comparing a size of the first training dataset and the second training dataset, wherein the similarity score is a function of a size difference. For example, similarity module 108 may determine that the size of the training dataset in input 104 is 10000 images and the size of training dataset 1 is 15000 images. The size difference is thus 5000 images. Here, the similarity score may be a weighted inverse of the size difference. For example, the similarity score may be calculated as 100*1/5000=0.02. As the size difference lessens, the similarity score increases.

In some aspects, comparing the first training dataset to the second training dataset further comprises comparing a size of entries in the first training dataset and the second training dataset, wherein the similarity score is a function of a size difference of the entries. For example, an image from input 104 may have a size of 512×512. An image from training dataset 1 may have a size of 500×500. There is thus a size difference of 144 pixels. The similarity score may be a weighted inverse of the size difference.

In some aspects, similarity module 108 determines the similarity score by determining a first structure of the input portion and the output portion of the first training dataset, wherein structure indicates a type of value in a given portion and a size of the given portion. For example, the type of value may be: a number, a letter, a symbol, etc. The size of the portion may be 300×2, which represents dimensions of a vector. Similarity module 108 may also determine a second structure of the input portion and the output portion of the second training dataset and subsequently determine a distance between the first structure with the second structure, wherein the similarity score is a function of the distance. This distance may be multiplied by 1 or 0 depending on whether the type of values match. For example, if the type of value for the first training dataset matches the second training dataset's type of value (e.g., both are numbers), the distance is multiplied by 1. If the respective types do not match, the distance is multiplied by 0. Suppose that the size of an input/output portion is 300×2 for the first training dataset and is 250×2 for the second training dataset. The distance may be determined by division such as 300/250× 2/2, yielding 1.2×1. When multiplied by 1, the distance is 1.2. The similarity score may be a weighted inverse of this distance (e.g., 2*1/1.2).

It should be noted that if the types do not match, the distance is 0, but the inverse becomes invalid because 1 cannot be divided by 0. This suggests that two training datasets with different value types are not considered similar. This is important because if a training dataset includes symbols, the machine learning model trained on that training dataset will include algorithms that may not be compatible with letters or numbers. This suggests that the machine learning model is not a good candidate for re-training.

In some aspects, the similarity score is a function of all of the features described above and each feature (e.g., distance, size difference, etc.) is weighted in a particular manner. For example, distance may be weighted twice as much as size difference. For example, the similarity score may be an inverse sum of all the values described above.

At 208, model selection component 102 determines whether the similarity score is greater than a threshold similarity score. For example, the similarity score may be 50 and the threshold similarity score may be 45. Accordingly, in response to determining that the similarity score is greater than the threshold similarity score, method 200 advances to 210, where model testing module 112 re-trains the machine learning model using the first training dataset. For example, model testing module 112 may use the training techniques indicated in metadata 1 (e.g., gradient descent) to train the machine learning model to learn new weights.

In some aspects, model adjustment module 110 may amend code associated with the machine learning model to accommodate structure differences between the first training dataset and the second training dataset. For example, if an image in the first training dataset has a size of 500×500 and an image in the second training dataset has a size of 512×512, model adjustment module 110 may add code that adjusts the size of the images in the first training dataset to 512×512. The added code may crop, upsample, down-sample, etc., images to resolve differences between the respective training datasets. In some aspects, model adjust-ment module 110 may change the code of the machine learning model by adjusting the weight vector size to match the sizes of the images in the first training dataset. Thus, if the machine learning model is conventionally written to receive images of size 512×512, the machine learning model can now accommodate images of size 500×500.

At 208, in response to determining that the similarity score is not greater than the threshold similarity score, method 200 advances to 212, where model selection com-ponent 102 selects a different machine learning model to re-train. For example, similarity module 108 may calculate a similarity score between the first training dataset of input 104 and training dataset 2.

At 214, model selection component 102 executes the re-trained machine learning model to generate an output corresponding to the first training dataset. For example, suppose that machine learning model 1 that was originally classifying planes is re-trained to classify cars. Model selec-tion component 102 may test the re-trained machine learning module with a testing dataset. In some aspects, the testing dataset is a portion of the training dataset that is isolated from the training dataset prior to re-training.

In some aspects, the re-trained machine learning model may be stored along with input 104 in model database 114. It should be noted, however, that if a first training dataset and a second training dataset are exact matches according to similarity module 108 or the similarity score is greater than a maximum threshold similarity score (implying that the two training datasets are mostly identical despite a few minor differences), the machine learning model may not be re-trained. Instead, the machine learning model with the closest matching training dataset to the input training dataset is selected for direct use by the user. This saves computing resources and prevents highly similar models from wasting storage space in model database 114.

In some aspects, contract module 116 may generate a smart contract for each trained machine learning module. Accordingly, trained models become unique smart objects and can be used (using smart contracts) by other service consumers. Suppose that model 3 is a re-trained machine learning model. Contracts module 116 may generate a smart contract to enable the usage of model 3 in FIG. 1 by a different user. The smart contract may indicate whether the model may be re-trained or simply used with the pre-trained weights. The smart contract may also indicate when the re-trained machine learning model may be used and for how long. Lastly, the smart contract may indicate usage require-ments (e.g., payments, content rules, etc.).

In some aspects, the machine learning model is one of a plurality of machine learning models (e.g., models 1, 2, 3, etc.) each with a corresponding training dataset (e.g., dataset 1, 2, 3, etc.). Similarity module 108 may determine a plurality of similarity scores by comparing the first training dataset to each corresponding training dataset, may rank the plurality of similarity scores, and may select the machine learning model to re-train in response to determining that the similarity score between the first training dataset and the second training dataset is highest in the ranking.

In some aspects, in response to determining that the similarity score is not the highest in the ranking, similarity module 108 may select a different machine learning model that is the highest in the ranking, re-train the different machine learning model using the first training dataset, and execute the re-trained different machine learning model to generate the output corresponding to the first training data-set.

In some aspects, model testing module 112 may evaluate the accuracy of the re-trained machine learning model using a test dataset (e.g., a portion of the training dataset isolated for testing purposes or an additional dataset provided by the user after the re-training is complete). Model testing module 112 may compare the accuracy to a threshold accuracy. For example, the accuracy may be 91% and the threshold accuracy may be 90%. In the event that the accuracy is higher than the threshold accuracy, model testing module 112 may simply store the re-trained machine learning model in model database 114. However, suppose that the threshold accuracy is 95%. In this case, because model testing module 112 determines that the accuracy is less than the threshold accuracy, model selection component 102 may select the next highest ranked machine learning model to re-train and evaluate.

In some aspects, if none of the re-trained machine learn-ing algorithms yield an accuracy greater than or equal to the threshold accuracy, model adjustment module 110 may identify the re-trained machine learning algorithm with the highest accuracy. Model adjustment module 110 may then determine the accuracy difference between the highest accu-racy and the threshold accuracy, and further determine whether the accuracy difference is less than a threshold accuracy difference. For example, the threshold accuracy difference may be 5% and the accuracy difference may be 2%. Because this value is quite close to the threshold accuracy, model adjustment module 110 may adjust the machine learning model to potentially yield a higher accu-racy. For example, model adjustment module 110 may use a different training function. If the original training function was stochastic gradient descent, for example, model adjust-ment module 110 may switch the function with Newton's method or conjugate gradient method. In another example, model adjustment module 110 may add neural layers or neurons to the machine learning model (in the case it is a neural network).

Figure 3:
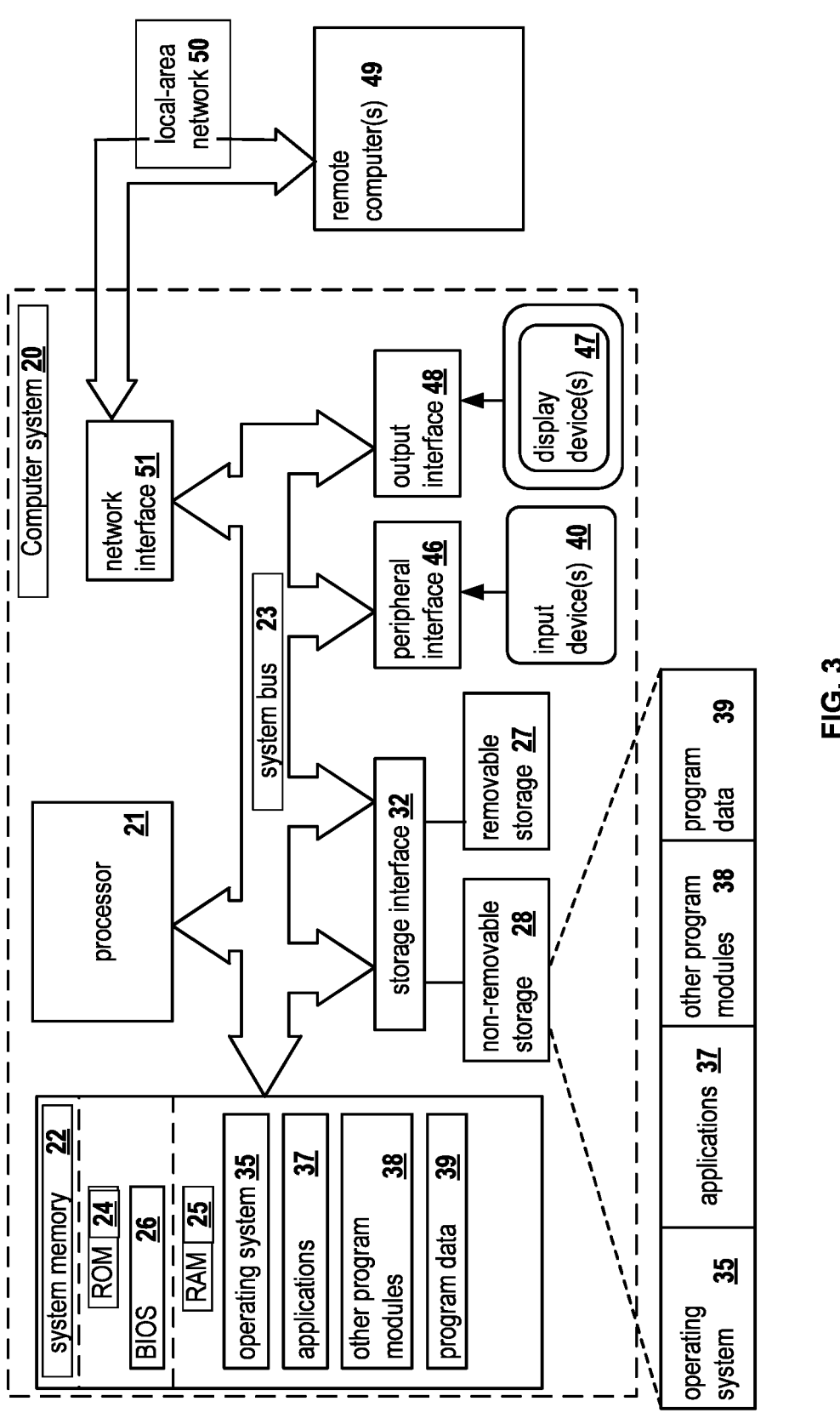
FIG. 3 presents an example of a general-purpose computer system on which aspects of the present disclosure can be implemented.

FIG. 3 is a block diagram illustrating a computer system 20 on which aspects of systems and methods for repurposing a machine learning model may be implemented in accor-dance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suit-able interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-2 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet.

Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for repurposing a machine learning model, the method comprising:

receiving a first training dataset;

determining an input portion and an output portion in an entry of the first training dataset;

comparing the first training dataset to a second training dataset used to train a candidate machine learning model, wherein the comparing includes calculating a similarity score between the input portion and the output portion of the first training dataset and an input portion and an output portion of the second training dataset;

in response to determining that the similarity score is greater than a threshold similarity score, re-training the candidate machine learning model using the first training dataset;

evaluating an accuracy of the re-trained candidate machine learning model against a threshold accuracy;

determining an accuracy difference between the accuracy and the threshold accuracy;

in response to determining the accuracy difference is less than a threshold difference, automatically performing a model adjustment comprising at least one of: (i) switching a training function of the machine learning model from a first type to a second type, or (ii) adding a neural layer to the machine learning model; and executing the adjusted re-trained candidate machine learning model on an input value to generate an output value corresponding to the first training dataset.

2. The method of claim 1, wherein determining the similarity score between the input portion and the output portion of the first training dataset and the input portion and the output portion of the second training dataset comprises:

determining a first structure of the input portion and the output portion of the first training dataset, wherein structure indicates a type of value in a given portion and a size of the given portion;

determining a second structure of the input portion and the output portion of the second training dataset; and determining a distance between the first structure with the second structure, wherein the similarity score is a function of the distance.

3. The method of claim 2, wherein determining the distance between the first structure with the second structure comprises:

determining if the type of value in the first structure matches the type of value in the second structure;

in response to determining that the types of value match, multiplying the distance by a first value; and in response to determining that the types of value do not match, multiplying the distance by a second value that indicates incompatibility.

4. The method of claim 1, wherein the candidate machine learning model is an image classifier, and wherein determining the similarity score further comprises:

identifying an object that the candidate machine learning model is configured to classify in accordance with the second training dataset;

identifying another object associated with the first training dataset; and comparing the object and the another object based on pixel representation, wherein the similarity score is a function of the comparing of the object and the another object.

5. The method of claim 1, wherein comparing the first training dataset to the second training dataset further comprises comparing a size of the first training dataset and a size of the second training dataset, wherein the similarity score is a function of a size difference.

6. The method of claim 1, wherein comparing the first training dataset to the second training dataset further comprises comparing a size of entries in the first training dataset and a size of entries in the second training dataset, wherein the similarity score is a function of a size difference between the entries in the first training dataset and the entries in the second training dataset.

7. The method of claim 1, wherein the candidate machine learning model is one of a plurality of machine learning models each with a corresponding training dataset, further comprising:

determining a plurality of similarity scores by comparing the first training dataset to each corresponding training dataset;

ranking the plurality of similarity scores; and selecting the candidate machine learning model to re-train in response to determining that the similarity score between the first training dataset and the second training dataset is highest in the ranking.

8. The method of claim 7, further comprising:

in response to determining that the similarity score is not the highest in the ranking, selecting a different machine learning model that is the highest in the ranking;

re-training the different machine learning model using the first training dataset; and executing the re-trained different machine learning model to generate the output value corresponding to the first training dataset.

9. The method of claim 1, further comprising: amending code associated with the candidate machine learning model to accommodate structure differences between the first training dataset and the second training dataset, wherein amending the code comprises adjusting a weight vector size of the candidate machine learning model to match a size of images in the first training dataset.

10. A system for repurposing a machine learning model, the system comprising:

a memory; and a hardware processor communicatively coupled with the memory and configured to:

receive a first training dataset;

determine an input portion and an output portion in an entry of the first training dataset;

compare the first training dataset to a second training dataset used to train a candidate machine learning model, wherein the comparing includes calculating a similarity score between the input portion and the output portion of the first training dataset and an input portion and an output portion of the second training dataset;

in response to determining that the similarity score is greater than a threshold similarity score, re-train the candidate machine learning model using the first training dataset;

evaluate an accuracy of the re-trained candidate machine learning model against a threshold accuracy;

determine an accuracy difference between the accuracy and the threshold accuracy;

in response to determining the accuracy difference is less than a threshold difference, automatically perform a model adjustment comprising at least one of: (i) switching a training function of the machine learning model from a first type to a second type, or (ii) adding a neural layer to the machine learning model; and execute the adjusted re-trained candidate machine learning model on an input value to generate an output value corresponding to the first training dataset.

11. The system of claim 10, wherein the hardware processor is configured to determine the similarity score between the input portion and the output portion of the first training dataset and the input portion and the output portion of the second training dataset by:

determining a first structure of the input portion and the output portion of the first training dataset, wherein structure indicates a type of value in a given portion and a size of the given portion;

determining a second structure of the input portion and the output portion of the second training dataset; and determining a distance between the first structure with the second structure, wherein the similarity score is a function of the distance.

12. The system of claim 11, wherein determining the distance between the first structure with the second structure comprises:

determining if the type of value in the first structure matches the type of value in the second structure;

in response to determining that the types of value match, multiplying the distance by a first value; and in response to determining that the types of value do not match, multiplying the distance by a second value that indicates incompatibility.

13. The system of claim 10, wherein the candidate machine learning model is an image classifier, and wherein the hardware processor is configured to determine the similarity score by:

identifying an object that the candidate machine learning model is configured to classify in accordance with the second training dataset;

identifying another object associated with the first training dataset; and comparing the object and the another object based on pixel representation, wherein the similarity score is a function of the comparing of the object and the another object.

14. The system of claim 10, wherein the hardware processor is configured to compare the first training dataset to the second training dataset by comparing a size of the first training dataset and a size of the second training dataset, wherein the similarity score is a function of a size difference.

15. The system of claim 10, wherein the hardware processor is configured to compare the first training dataset to the second training dataset by comparing a size of entries in the first training dataset and a size of entries in the second training dataset, wherein the similarity score is a function of a size difference between the entries in the first training dataset and the entries in the second training dataset.

16. The system of claim 10, wherein the candidate machine learning model is one of a plurality of machine learning models each with a corresponding training dataset, wherein the hardware processor is configured to:

determine a plurality of similarity scores by comparing the first training dataset to each corresponding training dataset;

rank the plurality of similarity scores; and select the candidate machine learning model to re-train in response to determining that the similarity score between the first training dataset and the second training dataset is highest in the ranking.

17. The system of claim 16, wherein the hardware processor is configured to:

in response to determining that the similarity score is not the highest in the ranking, select a different machine learning model that is the highest in the ranking;

re-train the different machine learning model using the first training dataset; and execute the re-trained different machine learning model to generate the output value corresponding to the first training dataset.

18. The system of claim 10, wherein the hardware processor is configured to:

amend code associated with the candidate machine learning model to accommodate structure differences between the first training dataset and the second training dataset.

19. A non-transitory computer readable medium storing thereon computer executable instructions for repurposing a machine learning model, including instructions for:

receiving a first training dataset;

determining an input portion and an output portion in an entry of the first training dataset;

comparing the first training dataset to a second training dataset used to train a candidate machine learning model, wherein the comparing includes calculating a similarity score between the input portion and the output portion of the first training dataset and an input portion and an output portion of the second training dataset;

in response to determining that the similarity score is greater than a threshold similarity score, re-training the candidate machine learning model using the first training dataset;

evaluating an accuracy of the re-trained candidate machine learning model against a threshold accuracy;

determining an accuracy difference between the accuracy and the threshold accuracy;

in response to determining the accuracy difference is less than a threshold difference, automatically performing a model adjustment comprising at least one of: (i) switching a training function of the machine learning model from a first type to a second type, or (ii) adding a neural layer to the machine learning model; and executing the adjusted re-trained candidate machine learning model on an input value to generate an output value corresponding to the first training dataset.

* * * * *